United States Patent [19]
Schneider et al.

[11] 3,788,580
[45] Jan. 29, 1974

[54] APPARATUS FOR MOUNTING MOVABLE DEVICES

[75] Inventors: Wolfgang Schneider, Hessheim; Egbert Diethelm Piekarek; Stefan Thommes, both of Frankenthal, all of Germany

[73] Assignee: Klein, Schanzlin & Becker Aktiengesellschaft, Frankenthal/Pfalz, Germany

[22] Filed: Dec. 1, 1971

[21] Appl. No.: 203,682

[30] Foreign Application Priority Data
Dec. 4, 1970 Germany............................ 2059639

[52] U.S. Cl................. 248/14, 52/573, 248/DIG. 1,
[51] Int. Cl. ......F16l 3/16, F16l/43/00, F16l 27/10
[58] Field of Search...... 248/14, 146, 16, 19, 23, 248/DIG. 1; 137/356; 52/573; 122/510; 165/53

[56] References Cited
UNITED STATES PATENTS

| | | | |
|---|---|---|---|
| 3,430,645 | 3/1969 | Stalph.............................. | 285/61 X |
| 3,606,979 | 9/1971 | Paine............................... | 52/573 X |
| 3,625,658 | 12/1971 | Closon............................ | 248/DIG. 1 |
| 2,703,559 | 3/1955 | Godshalk........................ | 122/510 X |
| 1,814,626 | 7/1931 | Allen............................... | 248/DIG. 1 |

FOREIGN PATENTS OR APPLICATIONS
477,276  5/1929  Germany............................ 122/510

*Primary Examiner*—J. Franklin Foss
*Attorney, Agent, or Firm*—Michael S. Striker

[57] ABSTRACT

A substantially spherical external reactor pump has an external portion extending therefrom. Three projections, relatively short in relation to the diameter of said pump, are disposed about the external portion substantially equidistant from one another. An annular stress-transmitting member consists of three concentric annular rings which are positioned adjacent to one another and together from an annular groove arranged to mate with the projections for engagement therewith. Each of the rings is independently movable, the two exterior rings being movable in vertical directions, while the center ring is movable in radial directions. The movement of the respective rings is limited by a series of brackets which are mounted on corresponding foundations, these being positioned behind corresponding projections. The temperature variations of the brackets are minimized to effect minimum displacement of the external reactor pump, and therefore the auxiliary equipment and conduits leading thereto. In the event of a rupture in one of the conduits, the resulting forces are transmitted by way of the rings to the brackets and to the foundation.

21 Claims, 2 Drawing Figures

APPARATUS FOR MOUNTING MOVABLE DEVICES

BACKGROUND OF THE INVENTION

Mounting apparatus for aggregates for external reactor pumps are well known. The prior-art mounting apparatus has generally required a substantial number of connecting parts, and thus has made assembly and the mounting procedure complex and expensive. The prior-art mounting methods have generally utilized a great number of tension bars which have been connected to the aggregate housing, either directly or by means of feet which were provided on the exterior surface of the aggregate housing. According to this procedure the feet, as well as the ends of the tension bars connected therewith, have generally been covered by insulation which likewise covered the rest of the housing. A great disadvantage in this method, therefore, was the non-uniform heating of the ends of the tension bars, since that portion covered by the insulation might reach very high temperatures, while the greater portion of the tension bar exterior to the insulation remained at a cooler temperature. This did not permit uniform expansion of the tension bars, and consequently local stresses were generally generated in the aggregate housing.

Another disadvantage of the prior-art mounting apparatus has been the need to utilize a great number of tension bars in order to insure a uniform distribution of stresses about the entire housing surface. However, because of the positioning of various conduits leading to and from the aggregate, this has somewhat interfered with the positioning of tension bars uniformly about the housing as would normally be desired. Consequently, certain portions of the aggregate housing were not properly supported by tension bars, this causing areas of weak support as well as non-uniform stresses in the housing. This particularly is a problem in the event of a rupture in one of the conduits, in which case substantially large forces are generated in random directions, which forces must be properly controlled if damage to the aggregate is to be prevented.

To compensate for the above-mentioned disadvantages in the prior-art apparatus, the aggregate walls have often been made thicker in order to be capable of being subjected to the large stresses and forces. Also, actual mounting of the aggregate was made difficult because the entire mounting structure had to be assembled after the aggregate was placed in its mounted position.

By utilizing tension bars fixed or connected to the feet of the aggregate, as described above, stresses generated as a result of the expansion and contraction of the tension members resulted in local stresses on the aggregate wall. The tension bars being connected to the foundation, the prior-art apparatus had the further disadvantage that large changes in the aggregate temperature occurred, in certain instances, causing the tension bars to be dislodged from the concrete foundation. This tendency was accentuated in those cases where the tension bars frequently varied over large temperature ranges. This, in some prior-art apparatus, was especially serious where the entire tension bars were subject to the temperature variations.

In some prior-art mounting apparatus, the movements of the aggregate, either in response to changes in its temperature or in response to forces exerted on the aggregate as a result of the rupture of one of the fluid-conducting conduits connected thereto, was excessive, thereby impairing the strength of and, finally, endangering the other fluid conduits to suffer a similar result.

SUMMARY OF THE INVENTION

Accordingly, is an object of the present invention to provide an apparatus for mounting devices subject to randomly distributed stresses which does not have the disadvantages of the prior art.

It is another object of the present invention to provide an apparatus for mounting an aggregate which is simple in construction and inexpensive to manufacture and which includes a minimal number of elements.

It is still another object of the present invention to provide an apparatus for mounting an aggregate which reduces the amount of heat transfer to the supporting elements which determine the level of the aggregate.

It is a further object of the present invention to provide an apparatus for mounting an aggregate which permits a substantial portion of the supporting elements to be assembled on the aggregate prior to mounting the same on the foundation.

It is still a further object of the present invention to provide a mounting apparatus for an aggregate which will reduce the likelihood of deforming the housing of the aggregate.

It is yet a further object of the present invention to provide an apparatus for supporting an aggregate which construction is such that in the event of breakage of one fluid-conveying connection undue stressing of the other connections will not result.

It is yet another object of the present invention to provide mounting apparatus for an aggregate of the above character which aggregate does not interfere with the optimum distribution of fluid-conveying conduits to and from said aggregate.

According to the present invention a combination consists of a foundation and an annular stress-transmitting member. Bracket means secured to said foundation and mounting said stress-transmitting member for movement in a plurality of directions, including a direction substantially axially and a direction substantially radially of said stress-transmitting member, is provided. An aggregate is provided which is subject to randomly distributed stresses, said aggregate having an external portion surrounded by said stress-transmitting member and having a plurality of relatively short projections spaced substantially equidistant from each other about said aggregate. The projections are confined with limited freedom of movement in said stress-transmitting member.

According to a presently preferred embodiment, said annular stress-transmitting member comprises three adjacent annular stress-transmitting rings extending about said external portion. Said projections are mounted about said external portion, said annular rings together forming an annular groove arranged to mate with said projections for engagement therewith. Namely, said rings are arranged to form two outer rings and one inner ring, the inner diameters of the outer rings being substantially equal to each other and the inner diameter of said inner ring being greater than the outer ring diameters to thereby form said groove. The projections are relatively short compared to the diameter of said external portion to thereby reduce the flexing stresses on said aggregate external surface in response to vertical forces applied to said projections.

Said bracket means comprises a plurality of bracket portions disposed about said external portion. Said aggregate has at least one connection for pressurized fluid, said connection being substantially diametrically opposite to one of the bracket portions. The bracket portions are secured to said foundation and are, in behind the radial direction of said transmitting member, a respective projection mounted on said external portion to enable the forces applied to the aggregate as a result of a rupture in the pressure fluid connection to be transmitted and absorbed by the respective opposite bracket portion and foundation.

The substantial surface area of the aggregate is covered with insulation while said external portion being exposed is exterior to said insulation to thereby withhold the temperature variations of said aggregate from said bracket means.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
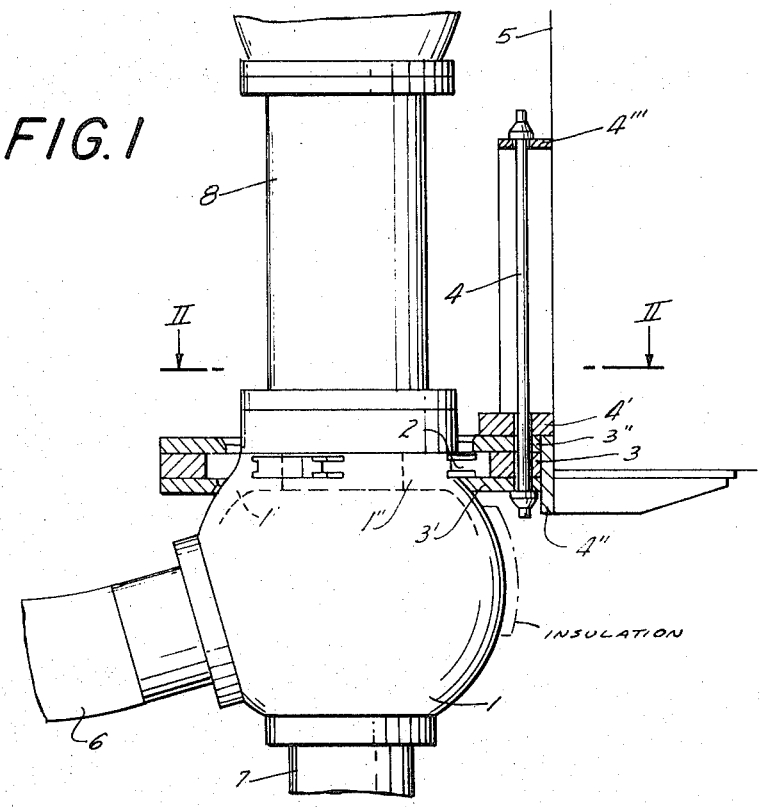
FIG. 1 is a side elevational view, partly in cross-section, of an apparatus for mounting aggregate according to the present invention.

Referring to FIG. 1, an external reactor pump or aggregate is shown which is to be mounted in a secure way which enables the pump 1 to be subjected to various stresses and forces hereafter to be described, without danger of being damaged. The pump has a housing wall 1' which forms a shell or membrane enclosing the fluids being pumped. The aggregate 1 is, according to the presently preferred embodiment, substantially spherically shaped as shown in FIG. 1. At the top of the aggregate 1, the spherical surface extends into an external portion 1'' which forms an annular wall having an external vertical circumferential surface. Three projections are mounted on the external portion 1'' and are substantially equidistant from each other thereabout. The projections are relatively short in relation to the outer diameter of the external portion 1''. An annular stress-transmitting member, consisting of annular rings 3, 3' and 3'', surrounds the external portion 1'', said rings being so dimensioned as to form a groove which contains portions of said projections which are confined therein and limited to the movements to be described.

Particularly, the annular stress-transmitting member comprises an inner ring 3 and bottom ring 3' and top ring 3'', said latter two rings comprising outer rings. As shown in FIG. 1, the outer rings are similarly shaped and have inner diameters which are substantially equal to one another. The inner ring 3 has an inner diameter which is greater than the outer ring diameters. By so selecting the inner diameters of the corresponding rings, the annular groove is formed which is intended to engage the projections 2 and limit their movement as will be described. As mentioned, the projections 2 are relatively small in the radial direction of the transmitting member. However, the projections 2 extend a distance in radial direction which is greater than the inner diameters of the outer rings 3' and 3'' so as to ensure engagement and support by the latter as well as being capable of transmitting the maximum anticipated vertical forces to the rings 3' and 3''. The three rings comprising the annular stress-transmitting member may consist of a temperature-conducting metal. However, because of the relatively small size of the projections 2 and as a result of the small contacting areas between the projections 2 and the rings 3', 3'', relatively low amounts of heat are transferred from the body of the aggregate to the annular rings or to the members supporting said rings as will be described.

As partly shown in FIG. 1, the aggregate 1 housing is covered with insulation in well known manner. However, the insulation extends up to the region of the external portion 1'' and does not extend beyond to cover the same. Consequently, the external portion 1'' is exposed and exterior to said insulation to thereby decrease the influence of the temperature variations of the aggregate 1 on the rings. This arrangement generally maintains the projections 2 as well as the rings 3, 3', 3'' at a temperature which is substantially cooler than that of the aggregate 1. For this additional reason, very little heat transfer is effected to the rings as well as the supporting members for supporting the same.

The annular rings 3, 3' and 3'' are each separate rings which are independently movable in relation to one another. The bottom ring 3' generally supports the weight of the aggregate 1 and is relatively stationary as to be described. However, the upper ring 3'' has dimensions so selected that it can move within predetermined limits in a vertical direction. In this manner, when the projections 2 do expand somewhat in response to elevated temperatures of the aggregate 1, the projections 2 can freely expand without damaging any of the rings, the upper ring 3'' merely being urged in the upward direction.

Bracket means are provided which support the annular rings 3, 3' and 3'' and limit their movements within predetermined limits. Thus, a connecting rod 4, in the form of a through-bolt, extends through the three annular rings and is provided with fastener means at its lower end. The upper end of the connecting rod 4 is anchored to the concrete foundation 5 as will be described. Above the top ring 3'' a bracket 4' is provided, which bracket is connected to the concrete foundation 5. The bracket 4' can be made part of the bracket 4''' or it can be a separate bracket which is fixed to the concrete foundation 5 in well known manner. A bracket 4'' is provided which extends along the outer circumferences of the respective annular rings, said bracket 4'' being fixed to the concrete foundation 5 for restraining movement of said rings along their radial directions. The bracket 4''', also connected to the concrete foundation 5, supports the connecting rod 4 and prevents said rod from moving in a downward direction.

As described thus far, the bracket 4''' supports the connecting rod 4. The connecting rod 4 supports the lower annular ring 3', which in turn supports the aggregate 1 via the projections 2. Movement of the lower ring 3' in a downward direction is prevented by the connecting rod 4, while the upward movement of the upper ring 3'' is prevented by the bracket 4'. The unlimited movement of the annular ring 3 in a radial direction is prevented by the bracket 4''.

Connections for pressurized fluid conduits 6, 7 and 8 are provided which enable the aggregate to perform its function in a well known manner. For example, the conduit 6 may represent the pressure pipe, while the conduit 7 may represent the suction or vacuum pipe. It will be appreciated that when one of these pipes ruptures due to an accident or other reason, substantial forces may be exerted on the aggregate 1 in directions which are not always predictable. However, it is usually known that the forces which will be exerted will be a function of the relative orientations of the conduits connected to the housing. Thus, for example, assuming that a rupture occurred in the pressure conduit 6, substantial forces would be imparted to the aggregate 1 in a direction towards the right. The present invention contemplates the possibility of such accidents occurring, and seeks to prevent total movements of the aggregate 1 which may damage either the aggregate 1 itself or the other conduits connected to it.

Figure 2:
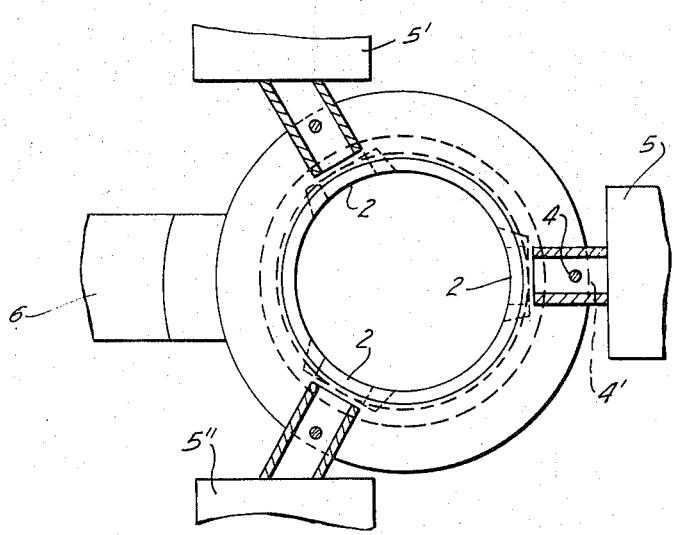
FIG. 2 is a top plan view of the mounted aggregate shown in FIG. 1, taken at II—II.

FIG. 2 illustrates the aggregate as shown in FIG. 1. However, in this Figure it is further illustrated how, according to the presently preferred embodiment, the distribution of the projections 2 is effected. Thus, the three projections 2 are clearly shown as being spaced approximately 120° from each other about the axial direction of the annular rings. It will be noted that similar bracket arrangements are utilized at each projection, whereby a respective set of brackets is positioned behind a projection and a corresponding foundation is positioned behind the set of brackets. Three separate foundations 5, 5' and 5'' are spaced to correspond with the spaced projections 2.

According to the presently preferred embodiment, at least one conduit 6 is arranged opposite a foundation 5 and its associated brackets and projections. In this manner, should there be a rupture in the conduit 6, the aggregate 1 will be urged a very short distance towards the right, namely the distance between the projections 2 and the inner diameter of the ring 3. Even though there is some play for the movement of the inner ring 3, the total distance through which the projection 2 can move towards the right is small compared to the diameter of the aggregate 1. In this manner no momentum is permitted to build up which may damage the aggregate 1 or the mounting brackets. It is therefore contemplated according to the present invention to limit the movement of the aggregate 1 to very small movements irrespective of the forces which may be applied to it and regardless of the directions in which these forces act. Should there be a rupture in the conduit 7, a vertical force will result upon the aggregate 1. However, such force will be exerted upon the projection 2. Since the projection 2 is relatively small compared to the diameter of aggregate 1, the forces transmitted to the projections 2 will be parallel and very nearly inside the plane of the external surface portion. In this manner, the forces effectively act along the aggregate wall, this minimizing the flexing moments which would be applied to the aggregate walls if the projections 2 extended a considerable distance away from said wall. Partially as a result of the reduced flexing moments, the present invention makes it possible to use aggregates having thin membranes or walls 1'.

As described, it is not always possible to predict the actual stresses or forces which will be exerted upon an aggregate. However, these forces can usually be resolved into vertical and horizontal forces. By providing an arrangement which can effectively absorb vertical and horizontal forces, this makes it also possible to handle other forces as well. In each case, the forces are directly and efficiently transmitted to a concrete foundation. Thus, downward vertical forces are transmitted to the lower ring 3' which in turn transmits this force to the connecting rod 4. The connecting rod 4 transmits the downward vertical force to the concrete foundation 5 by means of bracket 4'''. An upward vertical force is transmitted by the projections 2 to the upper ring 3'', which ring transmits the upward vertical force to the concrete 5 by means of the bracket 4'. On the other hand, horizontal or radial forces are transmitted by means of the projections 2 to the rings 3 which are in turn transmitted to the concrete foundation 5 by means of the bracket 4''. The limits of movement are preferably kept to minimum values, only sufficient to take into account expansion and contraction of the aggregate 1 in response to temperature changes thereof. Otherwise, these limits of movement should be kept to a minimum, since movement of the aggregate 1 results in stresses not only within the aggregate itself but likewise imparts flexing stresses to the connecting conduits which may or may not have the tendency to move in a common direction with the aggregate 1. Towards the end of further limiting the movement of the aggregate 1, as described above, the heat transfer from the aggregate to the annular rings and the brackets is kept to a minimum. As such, the projections 2 are exposed and the contacting areas between the projections 2 and the outer ring 3' and 3'' are kept to a minimum. This effectively maintains the rings as well as the brackets at a cooled temperature, this preventing the successive expansion and contraction of the prior art, which caused the movement of the aggregate and the connecting conduits.

It will be appreciated that the present invention, although the present embodiment is illustrated in terms of three projections 2 and three concrete foundations 5, 5' and 5'', is not limited to any specific number of such spaced elements. Any other number of spaced mounting points about the aggregate 1 which may be appropriate in a specific instance can equally be used.

In mounting the aggregate 1, one might begin by lowering a lower annular ring 3' over the external portion 1'' to a position shown in FIG. 1. Next, the projections 2 can be connected, such as by welding about the aggregate in a manner as described above. If the aggregate is cast, the projections can be made integral therewith. The center annular ring 3 and the top annular ring 3' can then be slipped over the aggregate to bring these into the positions adjacent to the lower ring 3' as shown in FIG. 1. After having prearranged the brackets in a manner described above, the aggregate 1, together with the annular rings, can be moved from a position below the connecting rod 4 and, while moving the aggregate and the annular ring in an upward direction, pass the connecting rod 4 through the appropriate holes provided in the annular rings. Once the upper annular ring 3'' has become engaged with the bracket 4', the lower part of the connecting rod 4 can be suitably meshed with a suitable fastening means. The fastening means meshed with the connecting rod 4 can be adjusted to bring the three annular rings into close proximity to one another, while not tightening said fastening means to prevent some play or free movement of the respective annular rings as described above.

Although not illustrated in the Figures, it is also possible, in order to decrease the effects of temperature changes on the annular rings and the brackets, to provide additional insulation which would insure that very little heat transfer flowed from the aggregate to the rings and the brackets.

It will be understood that each of the elements described above, or two or more together, may also find a useful application in other types of applications differing from the types described above.

While the invention has been illustrated and described as embodied in an externally mounted aggregate for an atomic reactor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a structure of the character indicated, a combination comprising a foundation; an annular stress-transmitting member including three adjacent coaxial annular rings; bracket means secured to said foundation and mounting said stress-transmitting member for movement in a plurality of directions including a direction substantially axially of and a direction substantially radially of said stress-transmitting member; and an aggregate subject to randomly distributed stresses and having an external portion surrounded by said stress-transmitting member, said aggregate having a plurality of relatively short projections substantially equally spaced thereabout, and said projections being confined with limited freedom of movement in said stress-transmitting member.

2. In a structure as defined in claim 1, wherein said projections are mounted about said external portion, said annular rings together forming an annular groove arranged to mate with said projections for engagement therewith.

3. In a structure as defined in claim 2, wherein said rings are arranged to form two outer rings and one inner ring, the inner diameters of said outer rings being substantially equal to each other, and the inner diameter of said inner ring being greater than said outer ring diameters, to thereby form said groove.

4. In a structure as defined in claim 3, wherein said projections extend radially and terminate at a distance from the common axis of said annular rings which is greater than one-half of said inner diameters of said outer rings to thereby assure supporting engagement therewith.

5. In a structure as defined in claim 4, wherein said distance is substantially equal to one-half of said inner diameter of said inner ring.

6. In a structure as defined in claim 1, wherein said projections are relatively short compared to the diameter of said external portion to thereby reduce the flexing stresses on said aggregate external surface which occur in response to vertical forces applied to said projections.

7. In a structure as defined in claim 3, wherein said bracket means comprises separate brackets disposed about at least one surface of said rings, whereby said outer rings are limited to predetermined vertical movements, and said inner ring is limited to predetermined radial movements.

8. In a structure of the character described, a combination comprising a foundation; bracket means secured to said foundation; an aggregate subject to randomly distributed stresses tending to move the same randomly in different directions, said aggregate being at least in part supported by said foundation; and single stress-transmitting means mounted on said bracket means for limited movement in a plurality of directions and cooperating with said aggregate at a plurality of spaced locations to limit the freedom of movement of said aggregate, said aggregate and said stress-transmitting means being provided at said locations with cooperating male and female coupling portions including projecting means rigid with said aggregate, and each of said male coupling portions having limited freedom of movement within the corresponding female coupling portion to therby limit the freedom of movement of said aggregate.

9. In a structure as defined in claim 8, wherein said bracket means comprises a plurality of brackets disposed about said stress-transmitting means for limiting the movement of the latter in said plurality of directions.

10. In a structure as defined in claim 8, wherein said stress-transmitting means comprises a substantially annular stress-transmitting member, and said plurality of directions includes a direction substantially radially of said stress-transmitting member, said aggregate including an external portion surrounded by said stress-transmitting member, and said projecting means comprising a plurality of projections substantially equally spaced about said aggregate.

11. In a structure as defined in claim 10, wherein said projections are welded to said external portion.

12. In a structure as defined in claim 10, wherein said bracket means comprises a plurality of bracket portions disposed about said external portion.

13. In a structure as defined in claim 12, wherein said aggregate has at least one connection for pressurized fluid, said connection being substantially diametrically opposite to one of said bracket portions.

14. In a structure as defined in claim 12, wherein said bracket portions are secured to said foundation and are behind, in the radial direction of said stress transmitting member, a respective projection mounted on said external portion.

15. In a structure as defined in claim 10, wherein said aggregate is covered with insulation over its greater external surface, said external portion being exposed and exterior to said insulation to thereby withhold the temperature variations of said aggregate from said bracket means.

16. In a structure as defined in claim 10, wherein said foundation comprises a plurality of separate foundations positioned behind, in the radial direction of said stress transmitting member, a respective one of said projections.

17. In a structure as defined in claim 8, wherein said bracket means is made from heat conductive metal.

18. In a structure as defined in claim 8, wherein said aggregate is substantially spherically shaped.

19. In a structure as defined in claim 10, wherein said aggregate includes said external portion which forms an annular extension therefrom.

20. In a structure as defined in claim 10, wherein said aggregate is cast and said projections are integrally formed therewith, said projections being substantially equally spaced from one another.

21. In a structure as defined in claim 10, wherein said axial direction is the vertical direction and said radial direction is the horizontal direction.

* * * * *